N. W. Boody, Stanchion.

No. 98,467. Patented Jan. 4, 1870.

Witnesses:
Henry C. Houston
Wm Franklin Seavey

Inventor:
N. W. Boody
per Wm H. Clifford
attorney

2 Sheets, Sheet 2
N. W. Boody,
Stanchion.
No. 98,467. Patented Jan. 4, 1870.
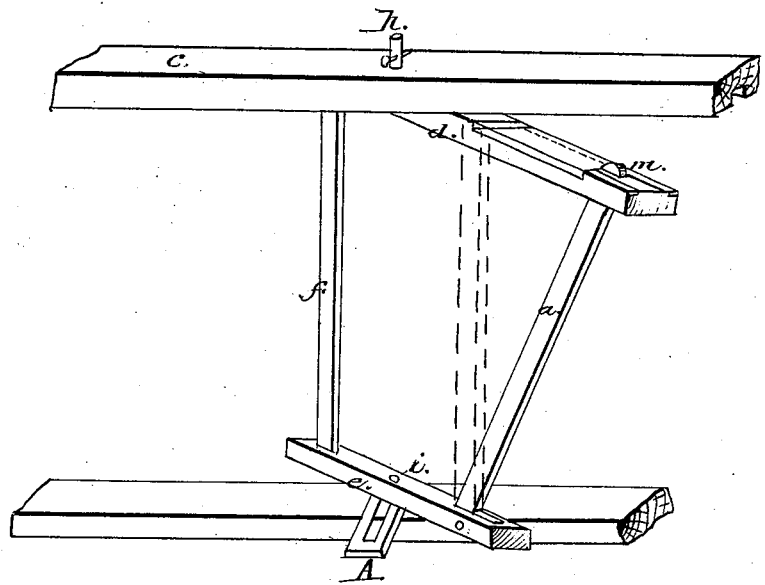
Witnesses:
Henry C. Houston
Wm Franklin Savery
Inventor:
N. W. Boody
Per. Wm H. Clifford
attorney

United States Patent Office.

N. W. BOODY, OF WESTBROOK, MAINE.

Letters Patent No. 98,467, dated January 4, 1870.

IMPROVEMENT IN CATTLE-STANCHION.

The Schedule referred to in these Letters Patent and making part of the same

*To all whom it may concern:*

Be it known that I, N. W. BOODY, of Westbrook, in the county of Cumberland, and State of Maine, have invented a new and useful Improved Cattle-Tie; and I hereby declare the following to be a full, clear, and exact description of the same, which will enable others to make and use my invention, reference being had to the accompanying drawings, forming part of this specification, in which—

Figure 1:
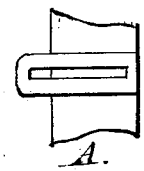
Figure 1:
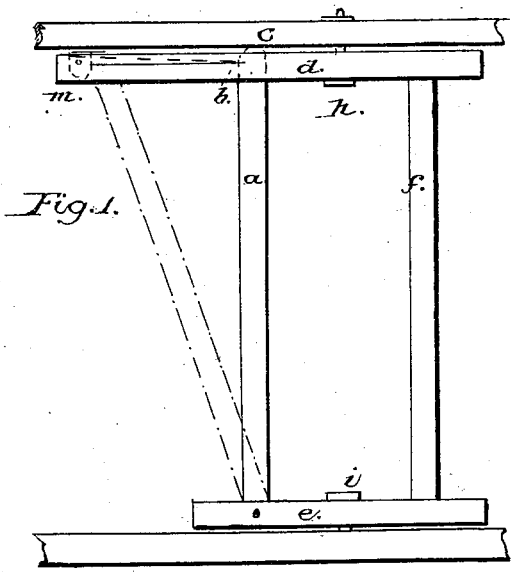
Figure 2:
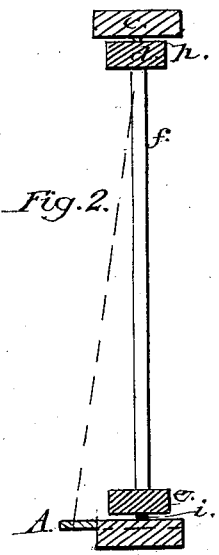

Figure 1, plate 1, is a side elevation.
Figure 2, plate 1, is an end elevation.
Plate 2 shows a perspective view of my invention.
A is a detail of the link.

My invention relates to a description of cattle-tie in which the animal is secured by the post $a$, which slips up beyond the tongue $b$, and is thus held in a vertical position, and when the creature is to be liberated, the said tongue is lifted, and the post $a$ thrown back, as shown in dotted lines, and thus the head can be withdrawn. This tongue has heretofore, however, been in the rigid bar $c$. This is a convenient tie, and one much used, but there are two objections to it: first, it does not admit of a sufficiently free motion of the creature's head from side to side; and second, being rigid at bottom and top, it does not allow the creature sufficient ease in rising, when lying down in the stall.

In my improvement, the tie proper consists of post $a$, post $f$, and cross-beams $d$ $e$. $f$ is rigid in the top and bottom pieces $d$ $e$, but the whole frame swings laterally on pivots $h$ $i$, thus allowing a side motion to the head of the creature. When cattle rise from a recumbent position, they first throw the body forward as they place themselves on their knees With the old form, they then throw their shoulders against the posts $a$ $f$, which is liable to injure them or chafe their shoulders. To obviate this, I put the lower pivot or bolt in the link A, and this allows the two posts to incline forward, as illustrated by the red line in fig. 2, and when the creature is up, the posts will resume their natural position.

Moreover, in reaching forward in the stall, this is easy for the neck. In short, both these motions give greater comfort and freedom to the animal in the stall.

The method of releasing and fastening the post $a$ is the same as in the old form, except that the tongue $b$ is in the moving cross-bar $d$, instead of a fixed one. A small truck, $m$, will hold the post $a$ when thrown back, and allow it to be easily released and drawn up.

What I claim as my invention, and desire to secure by Letters Patent, is—

The improved cattle-tie, so arranged as to swing laterally on bolts $h$ $i$, and to slide out at the bottom by means of the link A and bolt $i$, as and for the purposes herein set forth.

N. W. BOODY.

Witnesses:
 WM. H. CLIFFORD,
 HENRY C. HOUSTON.